P. G. OLSON.
GAGE GUARD.
APPLICATION FILED JAN. 3, 1910.

966,468.

Patented Aug. 9, 1910.

Witnesses
E. F. Stewart
Mason B. Lawton

Inventor
Peter G. Olson.
By C. A. Snow & Co.
Attorneys

THE NORRIS PETERS CO., WASHINGTON, D. C.

UNITED STATES PATENT OFFICE.

PETER G. OLSON, OF ST. PAUL, MINNESOTA.

GAGE-GUARD.

966,468.

Specification of Letters Patent. Patented Aug. 9, 1910.

Application filed January 3, 1910. Serial No. 535,984.

*To all whom it may concern:*

Be it known that I, PETER G. OLSON, a citizen of the United States, residing at St. Paul, in the county of Ramsey and State of Minnesota, have invented a new and useful Gage-Guard, of which the following is a specification.

It is the object of this invention to provide a gage glass guard, the component parts of which may readily be separated to give access to the gage glass.

Another object of the invention is to provide a shield for gage glasses, so constructed that the gage glass may readily be observed therethrough without substantially impairing the strength of the shield.

Another object of the invention is to provide a gage glass guard which, without materially impairing the visibility of the gage glass, will, at the same time, be thoroughly effective to protect the gage glass against injury, and, as well, be thoroughly effective to protect the eyes of the observer, should the gage glass burst while being inspected.

With these and other objects in view, the invention consists in the novel construction and arrangement of parts hereinafter described, delineated in the accompanying drawings, and specifically claimed, it being understood, that, since the drawings show but one form of the invention, changes, properly falling within the scope of what is claimed, may be made, without departing from the spirit of the invention.

Similar numerals of reference are employed to denote corresponding parts throughout the several figures of the drawings.

Figure 1:
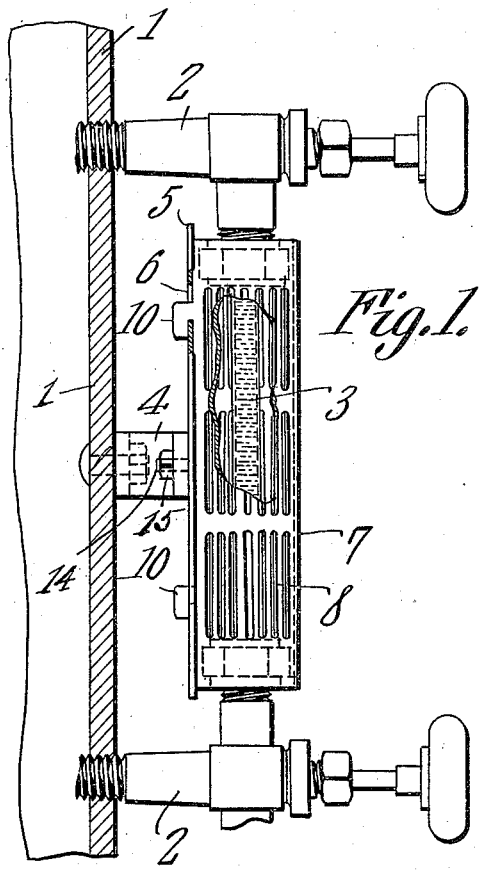
Figure 2:
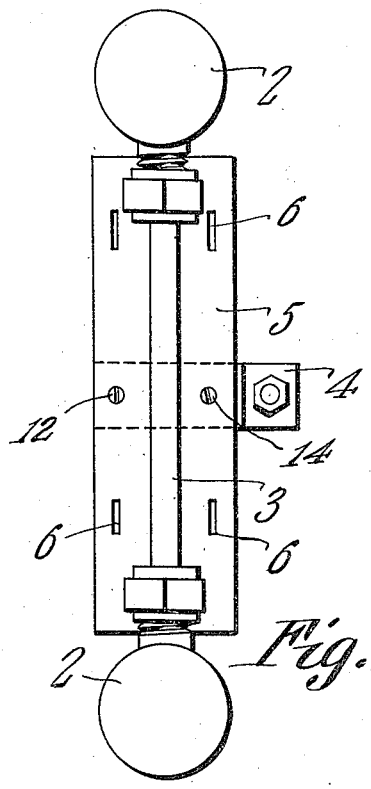
Figure 3:
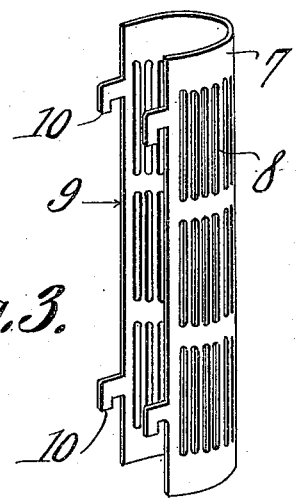
Figure 4:
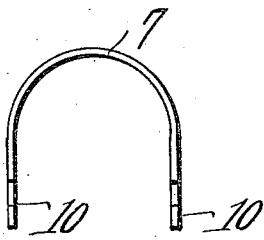

In the accompanying drawings,—Figure 1 is a side elevation, partly in section; Fig. 2 is a front elevation, the screen being removed; Fig. 3 is a perspective of the screen; and Fig. 4 is a bottom plan of the screen.

In the drawings, the numeral 1 denotes the boiler head, the numeral 2 the cocks, and the numeral 3 the gage glass which is supported between the cocks.

In carrying out the invention, a bracket 4, of any desired form, is provided, the same being adapted to be bolted, or otherwise secured to the boiler head 1, preferably between the cocks 2. A back plate 5, preferably flat, is located between the cocks 2, to the rear of the gage glass 3, and is bolted, or otherwise secured to the bracket 4, whereby the back plate 5 may be rigidly supported.

An arcuate shield 7 is fashioned from a metal plate and provided with a plurality of slots 8. These slots 8 extend longitudinally of the shield, and are disposed in transverse rows, spaced apart. The longitudinal edges 9 of the shield 7 are provided with spaced, depending lugs 10, adapted to enter longitudinally disposed openings 6, located entirely within the contour of the back plate 5, the construction being such that when the lugs 10 are introduced within the openings 6, the shield 7 will drop, under the impulse of its own weight, into interlocked relation with the back plate 5, thus inclosing transversely, the gage glass 3.

It should be noted that the guard, as an entity, is supported entirely independent of the gage glass 3 and its support. The gage glass and the cocks 2, may, therefore be adjusted and renewed when desired, without disturbing the guard, the guard, in its turn, may be mounted in place, dismembered, and renewed, without interfering in any way with the gage glass or the means whereby the same is supported.

By supporting the back plate 5 upon the bracket 4, the back plate may be disposed at any desired position with respect to the gage glass, either in a position close thereto, or remote therefrom, as may be determined by the particular means whereby the gage glass is supported.

The shield 7 may readily be removed when it is desired to have access to the gage glass, the construction of the shield being such that the gage glass is adequately protected, the interlocking coöperation between the lugs 10 and the openings 6 in the back plate being such that the shield 7 cannot be blown off, should the gage glass burst. The slots 8 are so disposed in the shield 7 that, although the gage glass may readily be observed therethrough, the eyes of the observer are protected against accidental bursting of the gage glass. By disposing the slots 8 of the shield in spaced, transverse rows, a portion of the shield 7 remains intact between adjacent transverse rows, thereby strengthening the shield 7.

The back plate 5 not only coöperates with the shield 7 in preventing particles of glass from being dispersed should the gage glass break, but, at the same time, serves to prevent the gage glass and its attaching parts from becoming overheated from the boiler-head. The gage glass and the packing glands in which it is commonly mounted, are thus prevented from expanding and contracting under temperature changes, the life of the gage glass thereby being greatly prolonged.

By referring to Fig. 2 of the drawings, it will be seen that there are holes 12 in the back plate 5, alined vertically with the openings 6. In these holes 12 are mounted bolts 14, whereby the back plate 5 is connected with the bracket 4, nuts 15 being mounted upon the extremities of the bolts 14. When the shield 7 is mounted in place, with the lugs 10 engaged in the openings 6, the edges of the shield will be held across the openings 12 and against the heads of the bolts 14, thus retaining the bolts in place within the back plate 5. Therefore, should the nuts 15 become loosened and slip from the bolts 14 upon which they are mounted, the said bolts, being restrained against longitudinal movement by the edges of the shield 7, will remain in place in engagement with the bracket 4.

Having thus described the invention, what is claimed is:—

A gage glass guard comprising a back plate provided with spaced openings and with a hole alined with the openings and adapted to receive support-engaging means; and an arcuate shield having lugs upon its edge to interlock with the back plate through the openings to hold the shield directly against the back plate, and to hold the edge of the shield across the hole.

In testimony that I claim the foregoing as my own, I have hereto affixed my signature in the presence of two witnesses.

PETER G. OLSON.

Witnesses:
D. P. W. HAMMERLE,
NORA C. HABBERSTAD.